United States Patent
Park et al.

(10) Patent No.: US 9,696,717 B2
(45) Date of Patent: Jul. 4, 2017

(54) APPARATUS AND METHOD OF SEGMENTING SENSOR DATA OUTPUT FROM A SEMICONDUCTOR MANUFACTURING FACILITY

(71) Applicant: SAMSUNG ELECTRONICS CO., LTD., Suwon-si, Gyeonggi-do (KR)

(72) Inventors: Hae-Sang Park, Seoul (KR); Young-Hak Lee, Suwon-si (KR); Jung-Hee Kim, Seongnam-si (KR); Heui-Sik Jeon, Suwon-si (KR); Eunjeong Lucy Park, Seoul (KR); Sungzoon Cho, Seoul (KR); Jooseoung Park, Seoul (KR); Jiwon Yang, Seoul (KR)

(73) Assignees: SAMSUNG ELECTRONICS CO., LTD., Suwon-si, Gyeonggi-Do (KR); SEOUL NATIONAL UNIVERSITY R & DB FOUNDATION, Seoul (KR)

( * ) Notice: Subject to any disclaimer, the term of this patent is extended or adjusted under 35 U.S.C. 154(b) by 516 days.

(21) Appl. No.: 14/279,629

(22) Filed: May 16, 2014

(65) Prior Publication Data

US 2015/0039117 A1 Feb. 5, 2015

(30) Foreign Application Priority Data

Aug. 5, 2013 (KR) .................... 10-2013-0092617

(51) Int. Cl.
*G05B 15/02* (2006.01)
*G05B 19/418* (2006.01)
*G05B 23/02* (2006.01)

(52) U.S. Cl.
CPC .......... *G05B 23/0221* (2013.01); *G05B 2219/37224* (2013.01); *Y02P 90/14* (2015.11)

(58) Field of Classification Search
None
See application file for complete search history.

(56) References Cited

U.S. PATENT DOCUMENTS 6,519,575 B1 2/2003 Goebel
6,868,512 B1 3/2005 Miller et al.
(Continued)

FOREIGN PATENT DOCUMENTS

EP 1 112 532 4/2003
JP 2008-170256 7/2008
(Continued)

OTHER PUBLICATIONS

English Abstract of WO2011002798 corresponding Korean Appln. No. 10-2012-0107846.

*Primary Examiner* — Umut Onat
(74) *Attorney, Agent, or Firm* — F. Chau & Associates, LLC

(57) ABSTRACT

An apparatus and method of segmenting sensor data are provided. The apparatus includes a sensor, a first segmentation unit, a continuity evaluation unit, a second segmentation unit, and a segmentation determination unit. The sensor collects sensor data for a process of the semiconductor manufacturing facility. The first segmentation unit extracts a variation point of the sensor data to perform an abnormal difference (AD) segmentation on the sensor data based on the at least one variation point. The continuity evaluation unit evaluates a continuity ratio of the sensor data. The second segmentation unit performs a free-knot spline (FS) segmentation on the sensor data when the continuity ratio exceeds a reference ratio. The segmentation determination unit compares the AD segmentation result with the FS segmentation result and to select one of the results on the comparison result.

20 Claims, 17 Drawing Sheets

(56) References Cited

U.S. PATENT DOCUMENTS

| | | | |
|---|---|---|---|
| 7,359,759 | B2 | 4/2008 | Cheng et al. |
| 7,477,960 | B2 | 1/2009 | Willis et al. |
| 7,640,070 | B2 * | 12/2009 | Chang ................ G05B 19/4184 700/110 |
| 2008/0188016 | A1 * | 8/2008 | Pare ........................ H01L 22/20 438/16 |
| 2008/0262771 | A1 | 10/2008 | Koo et al. |
| 2010/0143850 | A1 * | 6/2010 | Sekine ................ G03F 7/70475 430/319 |
| 2011/0257932 | A1 * | 10/2011 | Chu ................... G05B 23/0221 702/179 |

FOREIGN PATENT DOCUMENTS

| | | |
|---|---|---|
| KR | 1020060116193 | 11/2006 |
| KR | 100679721 | 1/2007 |
| KR | 1020090082536 | 7/2009 |
| KR | 1020120057541 | 6/2012 |
| KR | 10-2012-0107846 | 10/2012 |

\* cited by examiner

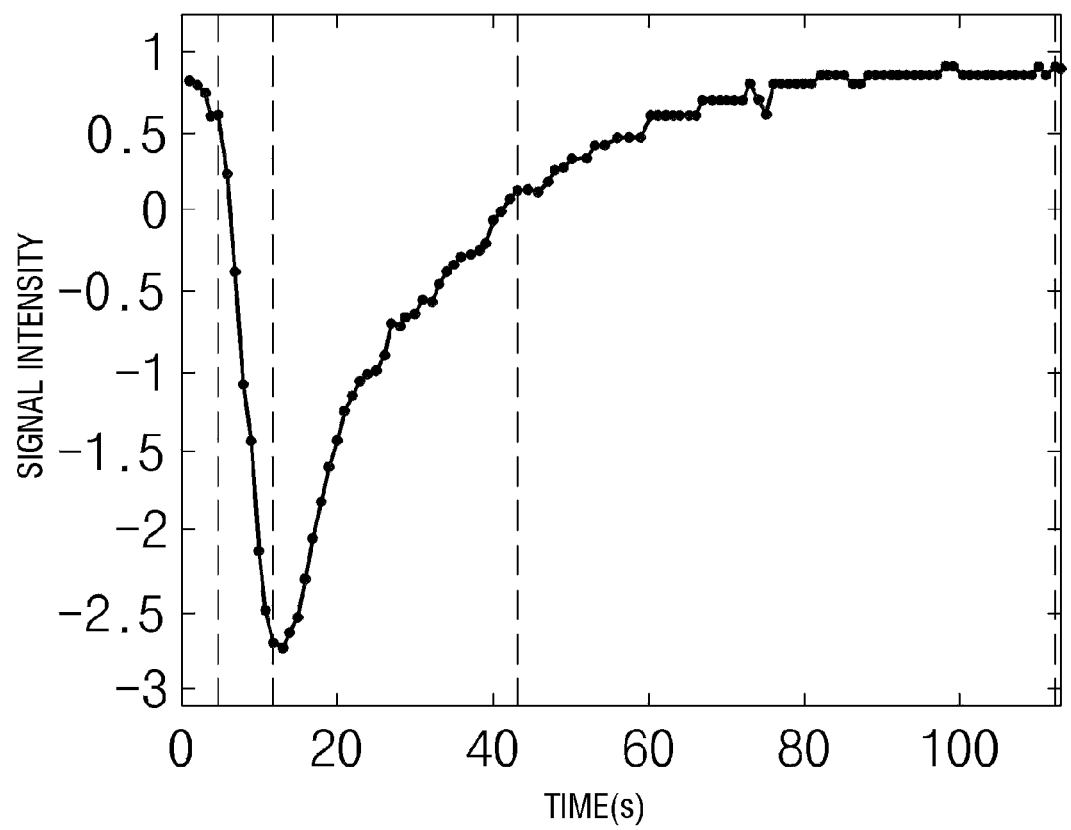

APPARATUS AND METHOD OF SEGMENTING SENSOR DATA OUTPUT FROM A SEMICONDUCTOR MANUFACTURING FACILITY

CROSS-REFERENCE TO RELATED PATENT APPLICATION

This application claims priority under 35 U.S.C §119 to Korean Patent Application No. 10-2013-0092617 filed on Aug. 5, 2013 in the Korean Intellectual Property Office, the disclosure of which is incorporated by reference herein in its entirety.

TECHNICAL FIELD

The present inventive concept relates to a semiconductor manufacturing facility, more particularly to an apparatus and a method of segmenting sensor data output from the semiconductor manufacturing facility.

DISCUSSION OF THE RELATED ART

Sensors are used to monitor semiconductor manufacturing processes with respect to temperature, pressure, time, or the like. The sensors may collect time series data (hereinafter, referred to as "sensor data") of each semiconductor manufacturing process to analyze performance of the facility or to monitor various states thereof.

For example, since the sensor data on each semiconductor manufacturing process is collected every single second or more seconds for several hundreds of seconds and is recorded for several hundreds of processes, an amount of sensor data to be collected may be large. A fault detection and classification (FDC) technology based on a statistical technique is used to analyze and monitor the large amount of sensor data.

The sensor data collected every second may be calculated to analyze and monitor the sensor data using the FDC technology, and thus calculation loads may be increased during the analysis of the sensor data. In this case, the calculation loads may be reduced by segmenting the sensor data into several segments having similar characteristics.

The method of segmenting the sensor data in the semiconductor processing facility includes, for example, a segmentation method using chamber step information according to a process recipe that is input to the semiconductor manufacturing facility and a segmentation method using detailed analysis by an engineer.

The segmentation method using chamber step information according to a process recipe is a method of segmenting the sensor data based on the assumption that processing signal characteristics are changed at the start and end of each step. Each chamber step is segmented by production information. Thus, although the number of chamber steps is one, further segmentation may be needed when sensor data has a variety of patterns. When the number of chamber steps is two or more and the sensor data has the same pattern, segmenting the sensor data using the chamber steps may cause waste of resources.

In addition, the segmentation method using detailed analysis by an engineer may take too much time.

SUMMARY

An exemplary embodiment of the present inventive concept provides a method and system for segmenting sensor data into optimal segments by detecting a signal variation pattern in a semiconductor processing facility.

According to an exemplary embodiment of the present inventive concept, an apparatus of segmenting sensor data output from a semiconductor manufacturing facility is provided. The apparatus includes a sensor, a first segmentation unit, a continuity evaluation unit, a second segmentation unit, and a segmentation determination unit. The sensor is configured to collect sensor data corresponding to at least one process of the semiconductor manufacturing facility. The first segmentation unit is configured to extract at least one variation point of the sensor data to perform an abnormal difference (AD) segmentation on the sensor data based on the at least one variation point, and to generate first segments. The continuity evaluation unit is configured to evaluate a continuity ratio of the sensor data. The second segmentation unit is configured to perform a free-knot spline (FS) segmentation on the sensor data when the continuity ratio exceeds a reference ratio and to generate second segments. The segmentation determination unit is configured to compare a result of performing the AD segmentation with a result of performing the FS segmentation and to select either the first segments or the second segments based on the comparison result.

The apparatus may further include a pre-processing unit. The pre-processing unit may be configured to make lengths of the sensor data equal to a first length. The first segmentation unit may be configured to determine a first point in the sensor data having the first length as the at least one variation point when an amount of variation at the first point is larger than a predetermined value.

The pre-processing unit may be configured to filter out abnormal data among the sensor data.

The first segmentation unit may be configured to recognize the at least one variation point as a separator to perform the AD segmentation.

The continuity evaluation unit may be configured to find a first time period corresponding to third segments among the first segments, and to evaluate the continuity ratio of the sensor data based on the first time period. The third segments may appear consecutively and each of the third segments has a non-zero value of variation.

The continuity evaluation unit may be configured to determine the sensor data as continuous-type data when the continuity ratio exceeds the reference ratio.

The second segmentation unit may be configured to perform the FS segmentation by repeatedly estimating and removing a position of a knot.

The apparatus may further include a post-processing unit. The post-processing unit may be configured to perform a post-processing process. The post-processing process may include incorporating a one-point segment into a segment nearer the one-point segment among the left and right segments with respect to the one-point segment when the one-point is among the first segments and the second segments.

The reference ratio may be about 50%.

The selecting of either the first segments or the third segments may be performed based on a determination of which segments of the first and second segments has less noise and a smaller number of segments.

According to an exemplary embodiment of the present inventive concept, a method of segmenting sensor data output from a semiconductor manufacturing facility is provided. The method includes collecting sensor data corresponding to at least one process of the semiconductor manufacturing facility, extracting at least one variation point of the sensor data, performing an abnormal difference (AD) segmentation on the sensor data based on at least one variation point to generate first segments, finding second segments among the first segments, wherein the second segments appear consecutively and each of the second segments has a non-zero of variation, evaluating a continuity ratio of the sensor data based on a time period corresponding to the second segments, performing a free-knot spline (FS) segmentation on the sensor data when the continuity ratio exceeds a reference ratio to generate third segments, comparing a result of performing the AD segmentation with a result of performing the FS segmentation result, and selecting either the first segments or the third segments based on the comparison result.

The method may further include performing a pre-processing process of making lengths of the sensor data equal to a first length. The extracting of the at least one variation point may include determining a first point in the sensor data as the at least one variation point when an amount of variation at the first point is larger than a predetermined value.

The performing of the AD segmentation may include recognizing the at least one variation point as a separator.

The evaluating of a continuity evaluation unit may include determining the sensor data as continuous-type data when the continuity ratio exceeds the reference ratio.

The performing of the FS segmentation may include repeatedly estimating and removing a position of a knot.

The selecting of either the first segments or the third segments may be performed based on a determination of which segments of the first and third segments has less noise and a smaller number of segments.

According to an exemplary embodiment of the present inventive concept, a method of segmenting sensor data output from a semiconductor manufacturing facility is provided. The method includes collecting sensor data corresponding to at least one process of the semiconductor manufacturing facility, performing a pre-processing process to make lengths of the sensor data for a plurality of wafers equal to a first length, extracting at least one variation point of the sensor data, performing a segmentation using a first algorithm on the sensor data based on at least one variation point to generate first segments, finding second segments among the first segments, wherein the second segments appear consecutively and each of the second segments has a non-zero of variation, evaluating a continuity ratio of the sensor data based on a time period corresponding to the second segments, performing a segmentation using a second algorithm on the sensor data when the continuity ratio exceeds a reference ratio to generate third segments, comparing a result of performing the segmentation using the first algorithm with a result of performing the segmentation using the second algorithm, and selecting either the first segments or the third segments based on the comparison result.

The first algorithm may be an abnormal difference algorithm and the second algorithm may be a free-knot spline algorithm.

The performing of a pre-processing process may include deriving a representative length for each chamber, making processing time lengths corresponding to the respective the plurality of wafers equal to each other, and filtering out a sensor corresponding to a first wafer having abnormal deviation and the first wafer.

BRIEF DESCRIPTION OF THE DRAWINGS

The present inventive concept will be more readily appreciated from the following description of the exemplary embodiments, taken in conjunction with the accompanying drawings of which:

FIGS. 7A-C are signal waveforms showing results of performing a free-knot spline (FS) segmentation on sensor data according to an exemplary embodiment of the present inventive concept.

DETAILED DESCRIPTION OF THE EMBODIMENTS

Hereinafter, exemplary embodiments of the present inventive concept will be described in detail with reference to the accompanying drawings. This inventive concept may be embodied in different forms and should not be construed as limited to the embodiments set forth herein.

Terms used in the present inventive concept may be defined as follows.

1) Trace signal data is signal data indicating a state of a semiconductor manufacturing facility, and is continuously calculated every predefined period (for example, 1 second).

2) A segmentation is a task of dividing the trace signal data having a time series form into several segments having similar characteristics. The time series form may be understood as for example, the trace signal data is repeated in a specific pattern with the elapse of time.

3) A segment is a data segment divided as a result of segmentation.

4) A continuous-value range is a time period occupied by segments that appear consecutively and each of which has a non-zero value of variation.

Figure 1:
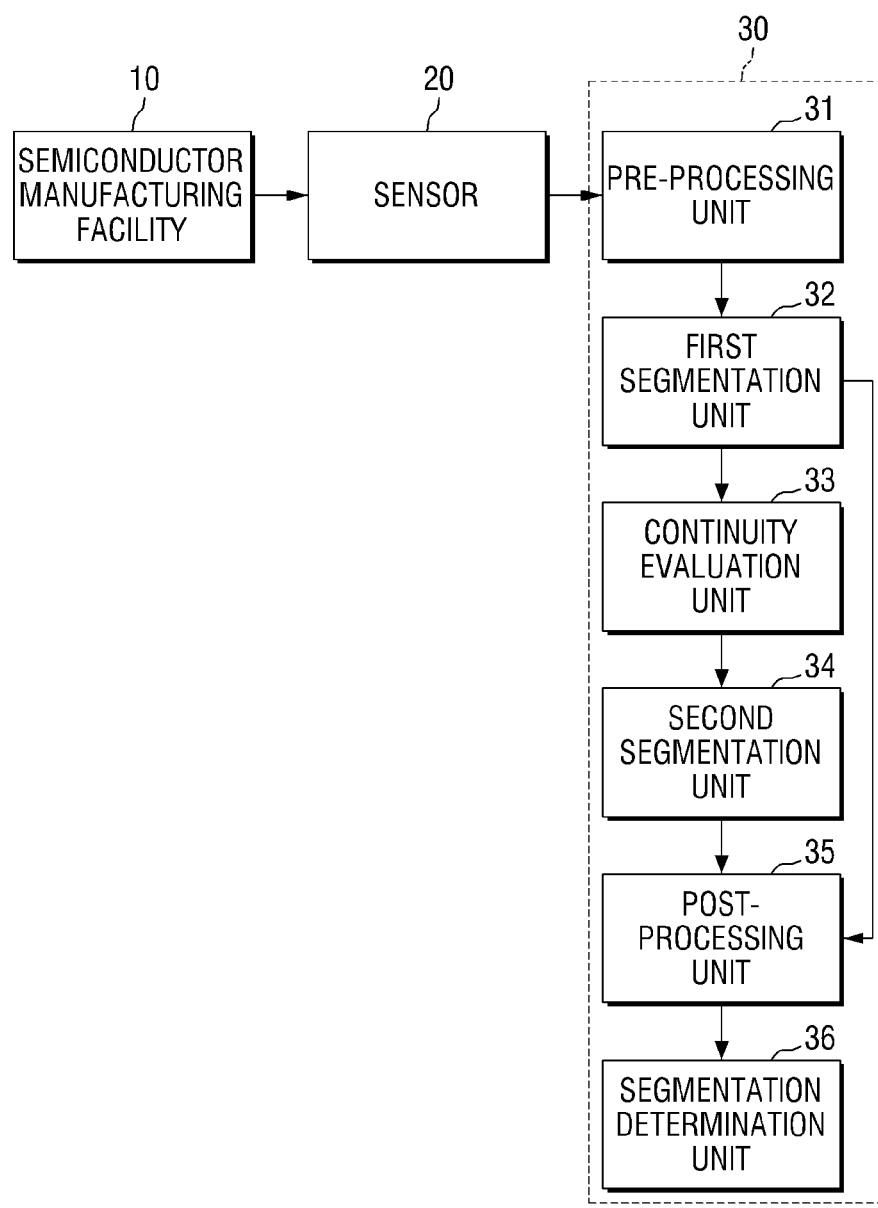
FIG. 1 is a block diagram showing a configuration of an apparatus of segmenting sensor data according to an exemplary embodiment of the present inventive concept.

FIG. 1 is a block diagram showing a configuration of an apparatus of segmenting sensor data output from a semiconductor manufacturing facility, according to an exemplary embodiment of the present inventive concept.

In FIG. 1, an apparatus 1 of segmenting sensor data output from the semiconductor manufacturing facility includes a semiconductor manufacturing facility 10, a sensor 20, and a controller 30. The semiconductor manufacturing facility 10 is configured to perform a semiconductor manufacturing process. The sensor 20 is configured to measure or collect data output from the semiconductor manufacturing facility 10. The sensor 20 may be installed in the semiconductor manufacturing facility 10. The controller 30 is configured to receive data measured through the sensor 20 and to monitor a process state of the semiconductor manufacturing facility 10 based on a process parameter of each manufacturing process.

The semiconductor manufacturing facility 10 is an industrial facility that performs a semiconductor manufacturing process for producing a plurality of semiconductor devices (for example, semiconductor wafers).

The sensor 20 may measure values (e.g., data) that correspond to a plurality processes for each semiconductor wafer and may monitor in real time states of the processes, for example, inside a chamber. Although one sensor 20 is illustrated in FIG. 1, more numbers (e.g., tens) of sensors 20 may be installed in the semiconductor manufacturing facility 10. There exist multiple sampling points in each process. A sampling point among the multiple sampling points is a position where the sensor 20 measures a value corresponding to a manufacturing process. For example, if it takes 100 seconds to perform a process with respect to, for example, temperature, data measured through the sensor 20 may be segmented into a plurality of segments (for example, 3 segments; 1 to 50 seconds, 50 to 70 seconds, and 70 to 100 seconds) according to recipe information, and statistic values (for example, a maximum value, a minimum value, an average value, a standard deviation) may be calculated using the sensor data for each segment.

The recipe information is chamber step information about a process. The chamber step information may be previously input to the semiconductor manufacturing facility 10 and may include information about a semiconductor device (for example, wafer) production method, a facility manipulation method, or the like. The production method and the facility manipulation method include a plurality of steps, and respective steps require different processes. The processes may relate to a temperature, a pressure, a time, a position of wafer, or the like. For example, a first segment may require that a process is performed for 50 seconds at 100 degrees Celsius, a second segment may require that a process is performed for 20 seconds at 30 degrees Celsius and 1 atmosphere pressure, and a third segment may require that a process is performed for 30 seconds at 130 degrees Celsius.

The controller 30 detects a pattern of sensor data measured through the sensor 20, extracts a variation point, and segments the sensor data into a plurality of optimal segments according to the variation point. The controller 30 includes a pre-processing unit 31, a first segmentation unit 32, a continuity evaluation unit 33, a second segmentation unit 34, a post-processing unit 35, and a segmentation determination unit 36.

The controller 30 segments the sensor data output from the semiconductor manufacturing facility 10 into a plurality of segments, calculates statistic values (for example, a maximum value, a minimum value, an average value, and a standard deviation) for each segment, and summarizes and stores information of the calculated statistic values in units of seconds, considering that the sensor data is time series data repeated in a specific pattern with the elapse of time.

The pre-processing unit 31 makes lengths of sensor data measured through the sensor 20 equal to a certain length. Since a processing time in each chamber step is different for each wafer, the process parameter values may be shifted to the left or right with respect to time and a processing time for a certain wafer may be long or short. To segment sensor data about the plurality of wafers at the same reference time point, the processing time lengths for the plurality of wafers may be made equal to each other. To this end, the following processes may be performed: deriving a representative wafer processing time length for each chamber step as a reference; applying the representative wafer processing time length to respective wafers; making the wafer processing time lengths corresponding to the respective wafers the same as each other (e.g., taking a median value of the wafer processing time lengths for each chamber step); filtering out sensors 20 having wafers with relatively great deviation and wafers having an unusual value; and integrating sensor signals for the plurality of wafers into one. For example, if a length of sensor data is shorter than the representative wafer processing time length, the length of the sensor data is adjusted by repeating the last value thereof. If the length of the sensor data is longer than the representative wafer processing time length, the length of the sensor data is adjusted by deleting the last value thereof. This aggregation process is called a "wafer aggregation". In this case, a median value for each process parameter value is used.

The first segmentation unit 32 extracts points where the sensor data, whose signal length is made equal to the certain signal length by the pre-processing unit 31, varies, and performs segmentation at a certain point where an amount of the variation in the sensor data is larger than a predetermined value.

For example, the first segmentation unit 32 finds all points where a differential value of the sensor data is larger than the predetermined value, recognizes the points as separators, and combines Constant with Piecewise Linear to approximate original sensor data. Since the sensor data is segmented according to similar characteristics, appropriate segments having a small number of separators and a minimized gap between the segments may be generated.

From among segments segmented by the first segmentation unit 32, the continuity evaluation unit 33 finds one or more consecutive segments having a non-zero value of the variation and evaluates whether a continuity ratio of the sensor data exceeds a reference ratio (for example, 50%). The continuity ratio of the sensor data is a ratio of consecutive segments having a non-zero value of the variation to total segments in the sensor data. For example, the continuity evaluation unit 33 finds all segments having a differential value of non-zero, finds a certain time period (e.g., continued-value range) corresponding to consecutive segments each which has a differential value of non-zero, and performs Piecewise Linear Segmentation which is a kind of linear segmentation. This introduces the concept of classifying differential values that consistently increase/decrease into the same group. However, when a signal has a continuous characteristic and thus has a small differential value, it might not be obvious at which point to perform segmentation. In this case, the sensor data may be determined whether it is discrete-type data or continuous-type data according to continuity.

When a continuity ratio of the sensor data exceeds a reference ratio (e.g., approximately, 50%), the continuity evaluation unit 33 evaluates the sensor data as the continuous-type data and performs subsequent steps for optimal segmentation. When the continuity ratio of the sensor data does not exceed the reference ratio (e.g., approximately, 50%), the continuity evaluation unit 33 evaluates the sensor data as the discrete-type data to segment the sensor data into segments in the current segmented state.

The second segmentation unit 34 performs segmentation by repeatedly estimating and removing a position of a knot using a free-knot spline (FS) algorithm when the continuity ratio of the sensor data exceeds the reference ratio (e.g., approximately, 50%) and thus, generates a small number of segments with low noise.

When there exists a segment having one point (hereinafter, referred to as an "one-point segment") among segments generated through the first segmentation unit 32 and the second segmentation unit 34, the post-processing unit 35 includes or incorporates the one-point segment into a segment nearer the one-point segment among the left and right segments with respect to the one-point segment. The one-point segment might not have meaning as one segment.

The segmentation determination unit 36 compares a segmentation result (e.g., AD) of the first segmentation unit 32 with a segment result (e.g., FS) of the second segmentation unit 34 to select one of the results (e.g., AD and FS) according to linearity and parsimony. For example, the segmentation determination unit 36 compares the original sensor data with the segmentation result of the first segmentation unit 32 and the segment result of the second segmentation unit 34 and selects a segmentation result having lower noise and a smaller number of segments between the AD segmentation result and the FS segmentation result.

Hereinafter, an apparatus and a method of segmenting sensor data output from the semiconductor manufacturing facility according to an exemplary embodiment of the present inventive concept will be described.

Figure 2:
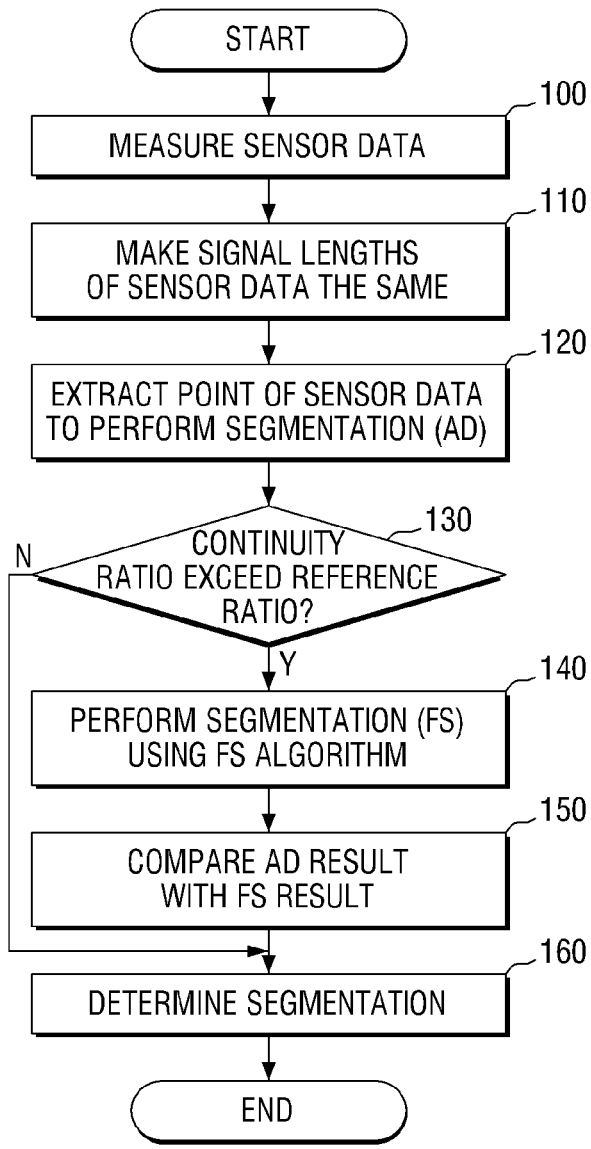
FIG. 2 is a flowchart showing a method of segmenting sensor data according to an exemplary embodiment of the present inventive concept.

FIG. 2 is a flowchart showing a method of segmenting sensor data output from a semiconductor manufacturing facility according to an exemplary embodiment of the present inventive concept.

Referring to FIGS. 1 and 2, the sensor 20 measures sensor data about a process and then delivers the sensor data to the controller 30 in operation 100.

The controller 30 makes lengths of the sensor data delivered from the sensor 20 equal to a certain length through the pre-processing unit 31 in operation 110. The operation 110 will be described later in more detail with reference to FIG. 3.

The pre-processing unit 31 starts its operation using process parameter values for several wafers, which are measured by the sensor 20. Since a processing time in each chamber step is different for each wafer, the process parameter values may be shifted to the left or right with respect to time, and thus a processing time for a wafer (e.g., wafer processing time) may be long or short. To segment sensor data measured for a plurality of wafers at the same reference time point, processing time lengths for the plurality of wafers may be made the same as each other (See FIG. 4).

The first segmentation unit 32 of the controller 30 extracts a point where the sensor data, whose signal length is made equal to the certain length by the pre-processing unit 31, varies, and performs segmentation at a certain point where an amount of the variation in the sensor data is larger than a predetermined value in operation 120. For example, the certain point where the amount of the variation in the sensor data is larger than the predetermined value may be understood as a point where a differential value of the sensor signal is larger than a predetermined value (e.g., abnormal difference, AD). Thus, the sensor data in each segment has similar signal characteristics (See FIG. 5).

For example, the first segmentation unit 32 finds all points where a differential value of the sensor data is larger than a predetermined value, recognizes the points as separators, and combines Constant with Piecewise Linear to approximate an original sensor data. Since the sensor data is segmented according to similar characteristics, appropriate segments having a small number of separators and a minimized gap between the segments may be generated.

From among segments segmented by the first segmentation unit 32, the continuity evaluation unit 33 of the controller 30 finds one or more consecutive segments having a non-zero value of the variation and evaluates whether the continuity ratio of the sensor data exceeds a reference ratio (e.g., approximately, 50%) in operation 130.

For example, the continuity evaluation unit 33 finds all segments having a differential value of non-zero, finds a time period (e.g., continued-value range) where a plurality of segments (e.g., three or more) having a differential value of non-zero occur consecutively, and performs Piecewise Linear Segmentation (See FIG. 6).

As a result of the determination of operation 130, when the continuity ratio of the sensor data exceeds the reference ratio (e.g., approximately, 50%), the segmentation determination unit 36 determines the sensor data to be the continuous-type data and performs segmentation by repeatedly estimating and removing a position of a knot using an FS algorithm in operation 140.

For example, when the sensor data has a continuous signal pattern, the segmentation is performed using the FS algorithm. Conditions for optimal segmentation may include linearity and parsimony. The linearity allows increase, constancy, and decrease of the variation in the sensor data to be easily represented, and inflection points of a curve are approximated to Piecewise Linear, using the linearity.

When only the linearity is considered for the sensor data having noise, too many segments may be segmented. Thus, parsimony for limiting the number of segments may be considered.

Kalman Filter and a change point detection method have been proposed to sense the variation in the data. However, when there is an exceptional case included in a number of signals, for example, a specific wafer has an abnormal signal, the methods described in the above might not process all types of abnormal signals such as a signal having an abrupt variation, a signal having a gradual variation, or a mixed-type signal.

The AD and FS algorithm applied to an exemplary embodiment of the present inventive concept may find variations in a continuous signal pattern as well as discrete-type data.

There may exist a one-point segment among segments generated through the first segmentation unit 32 and the second segmentation unit 34. Since the one-point segment has no meaning as one segment, a post-processing process is performed to include or incorporate the one-point segment into a segment nearer the one-point segment among the left and right segments with respect to the one-point segment.

In addition, the segmentation determination unit 36 of the controller 30 compares the original sensor data with a segmentation result (e.g., AD) of the first segmentation unit 32 and a segment result (e.g., FS) of the second segmentation unit 34 in operation 150 and selects a segment result (e.g., either AD or FS) having lower noise and a smaller number of segments in operation 160.

As a result of the determination of operation 130, when the continuity ratio of the sensor data does not exceed the reference ratio (e.g., approximately, 50%), the segmentation determination unit 36 determines the sensor data to be the discrete-type data and performs the segmentation by using the AD algorithm.

Figure 3:
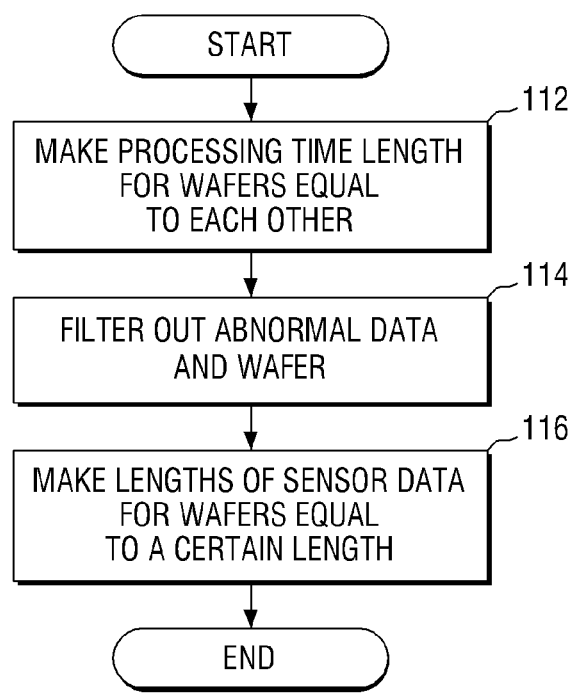
FIG. 3 is a flowchart showing a method of performing a pre-processing process on sensor data according to an exemplary embodiment of the present inventive concept.

FIG. 3 is a flowchart showing a method of performing a pre-processing process on sensor data according to an exemplary embodiment of the present inventive concept.

Figure 4A:
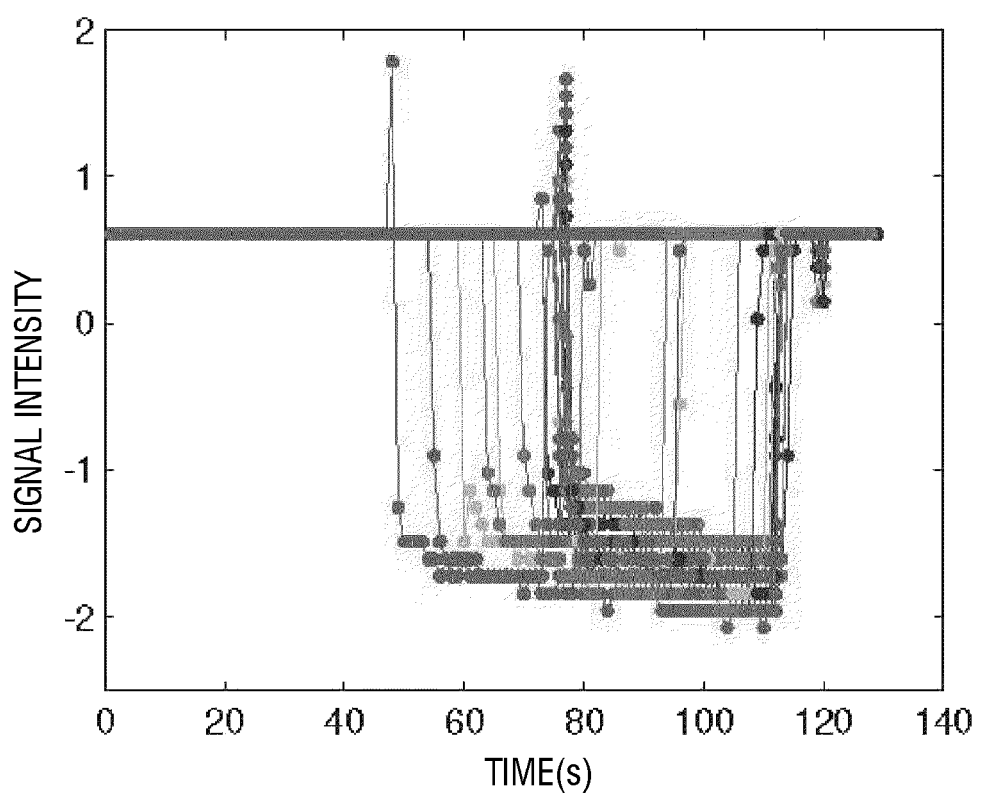
FIGS. 4A-D are signal waveforms showing results of performing a pre-processing process on sensor data according to an exemplary embodiment of the present inventive concept.
Figure 4B:
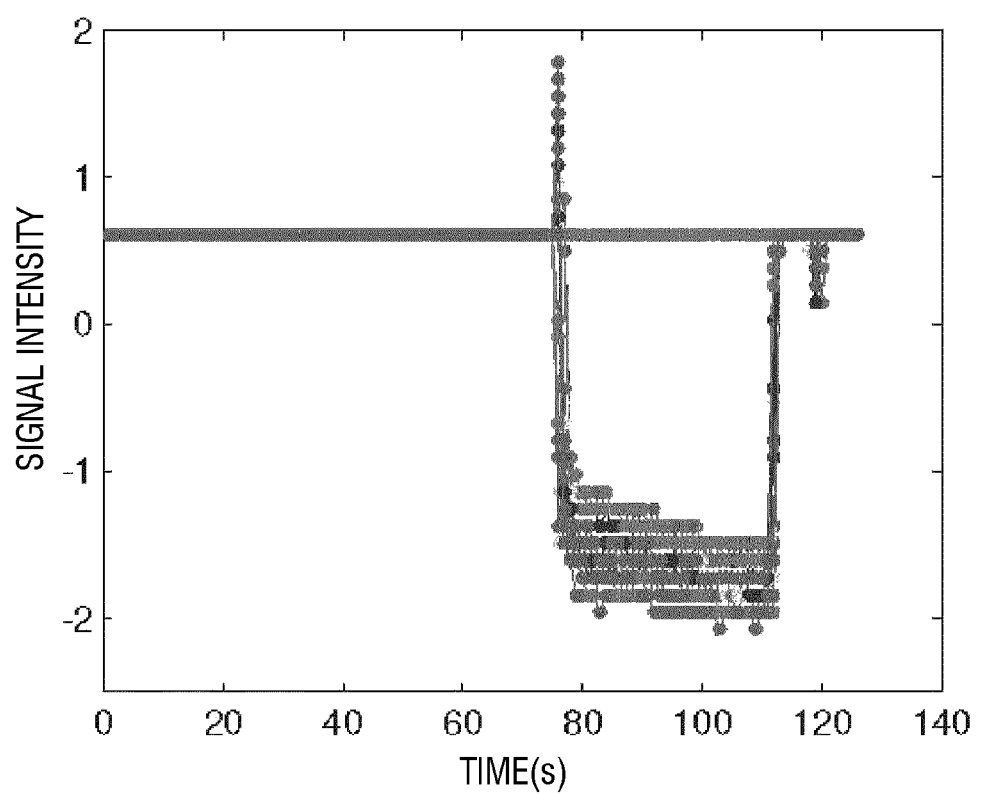

Referring to FIG. 3, the pre-processing unit 31 derives a representative wafer processing time length for each chamber step as a reference, applies the representative wafer processing time length to respective wafers, and makes the wafer processing time lengths corresponding to the respective wafers the same as each other in operation 112 (See FIG. 4B). In this case, a median value of the wafer processing time length for each chamber step may be taken.

Figure 4C:
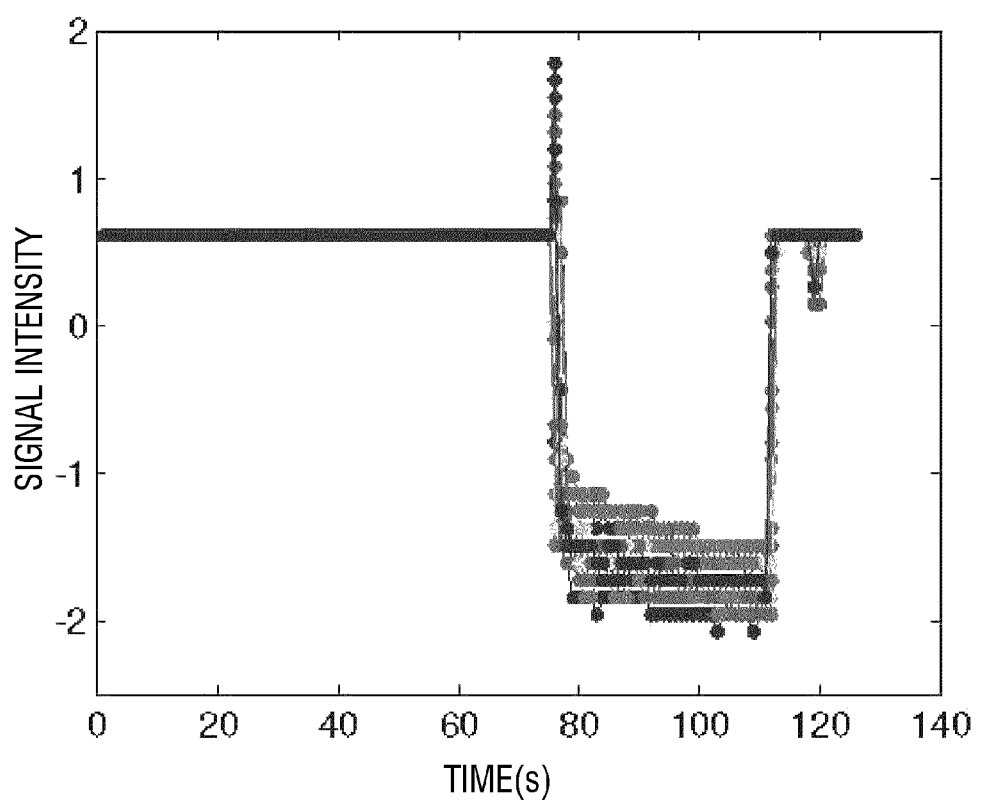
Figure 4D:
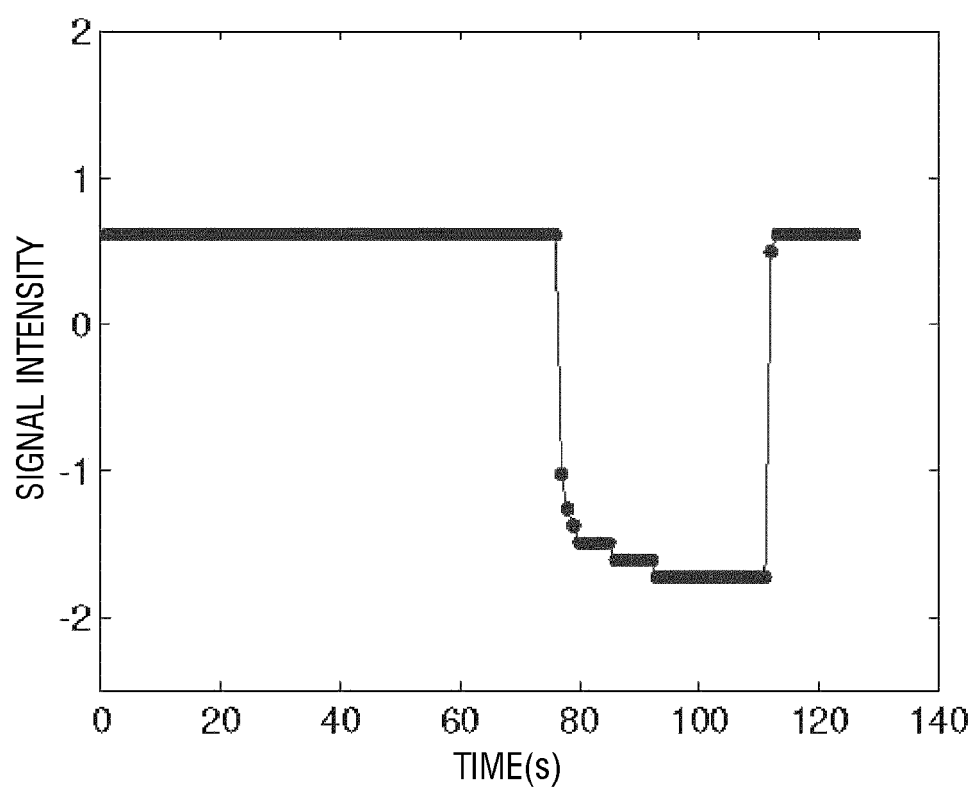

Next, the pre-processing unit 31 filters out sensors 20 corresponding to wafers having relatively great deviation and the wafers having an unusual value in operation 114 (See FIG. 4C) and makes the lengths of the sensor data for several wafers equal to a certain length in operation 116 (See FIG. 4D). For example, if the length of the sensor data is shorter than the representative wafer processing time length, the length of the sensor data is adjusted by repeating the last value of thereof. If the length of the sensor data is longer than the representative wafer processing time length, the length of the sensor data is adjusted by deleting the last value thereof.

FIGS. 4A-D are signal waveforms showing results of performing a pre-processing process on sensor data according to an exemplary embodiment of the present inventive concept FIG. 4A is a signal waveform of original data, FIG. 4B is a signal waveform of standard data obtained by equalizing wafer processing time lengths for each chamber step, FIG. 4C is a signal waveform of standard data on which wafer filtering has been performed, and FIG. 4D is a signal waveform where lengths of standard data for several wafers are made equal to a certain length.

As shown in FIG. 4D, sensor data is segmented in substantially the same reference time point by equalizing processing time lengths of respective wafers through the pre-processing process.

Figure 5:
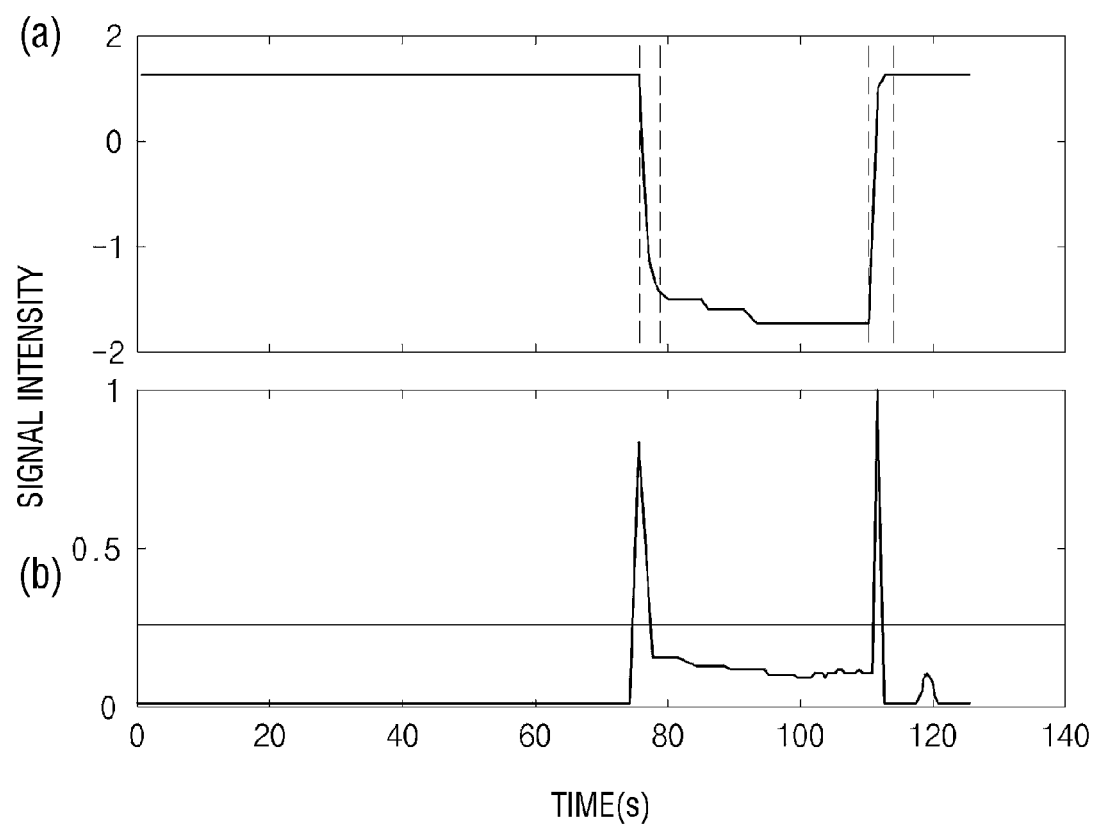
FIG. 5 includes signal waveforms showing a result of performing an abnormal difference (AD) segmentation on sensor data according to an exemplary embodiment of the present inventive concept.
Figure 6A:
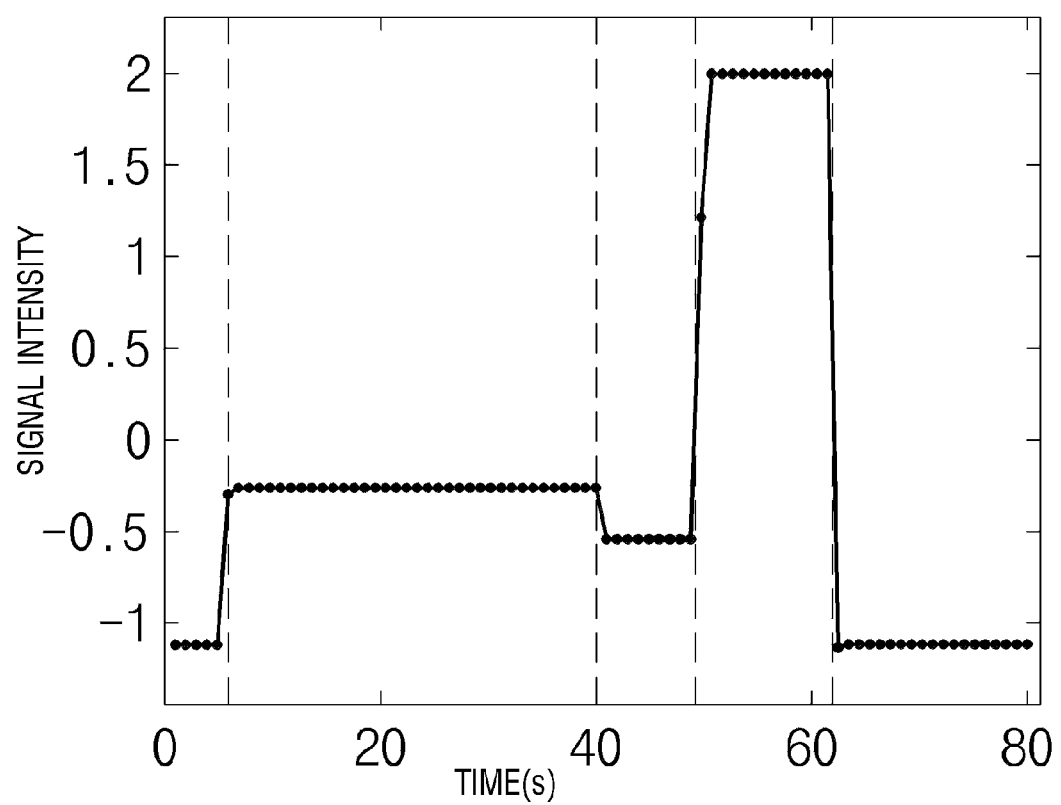
FIGS. 6A-D are signal waveforms showing results of finding segments having a non-zero value of variation and performing linear segmentation according to an exemplary embodiment of the present inventive concept.
Figure 6B:
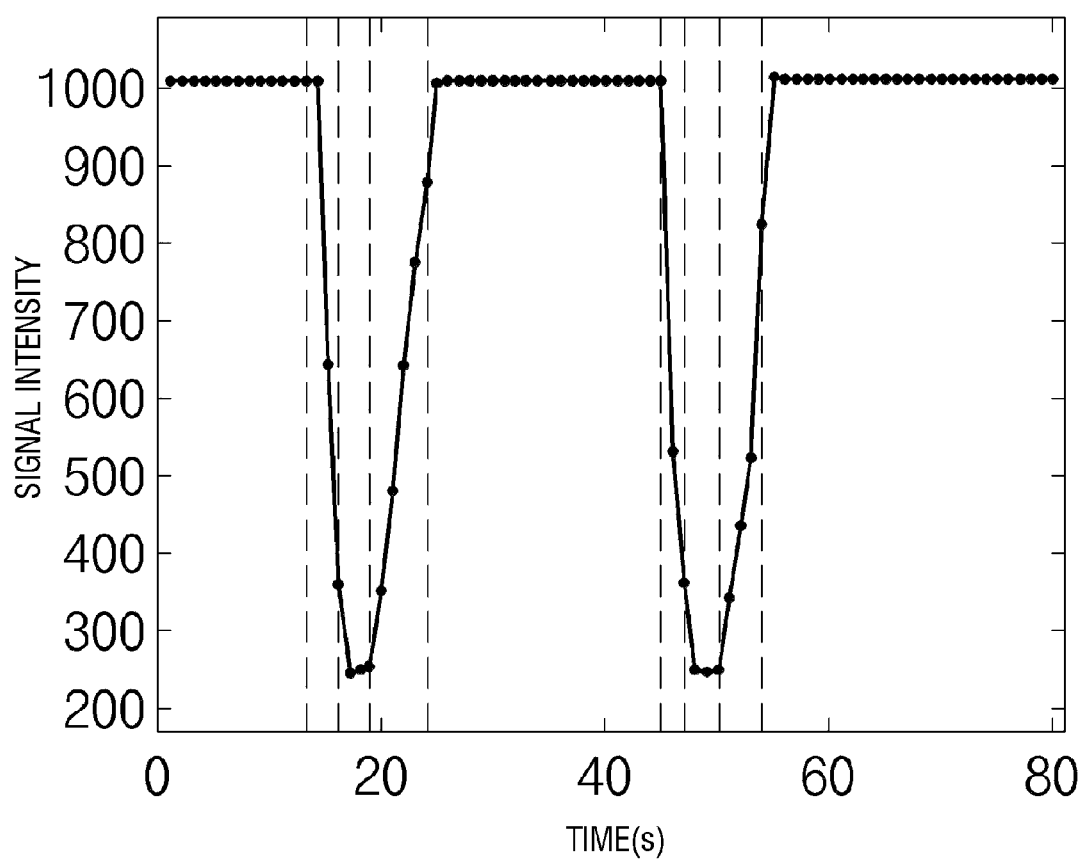
Figure 6C:
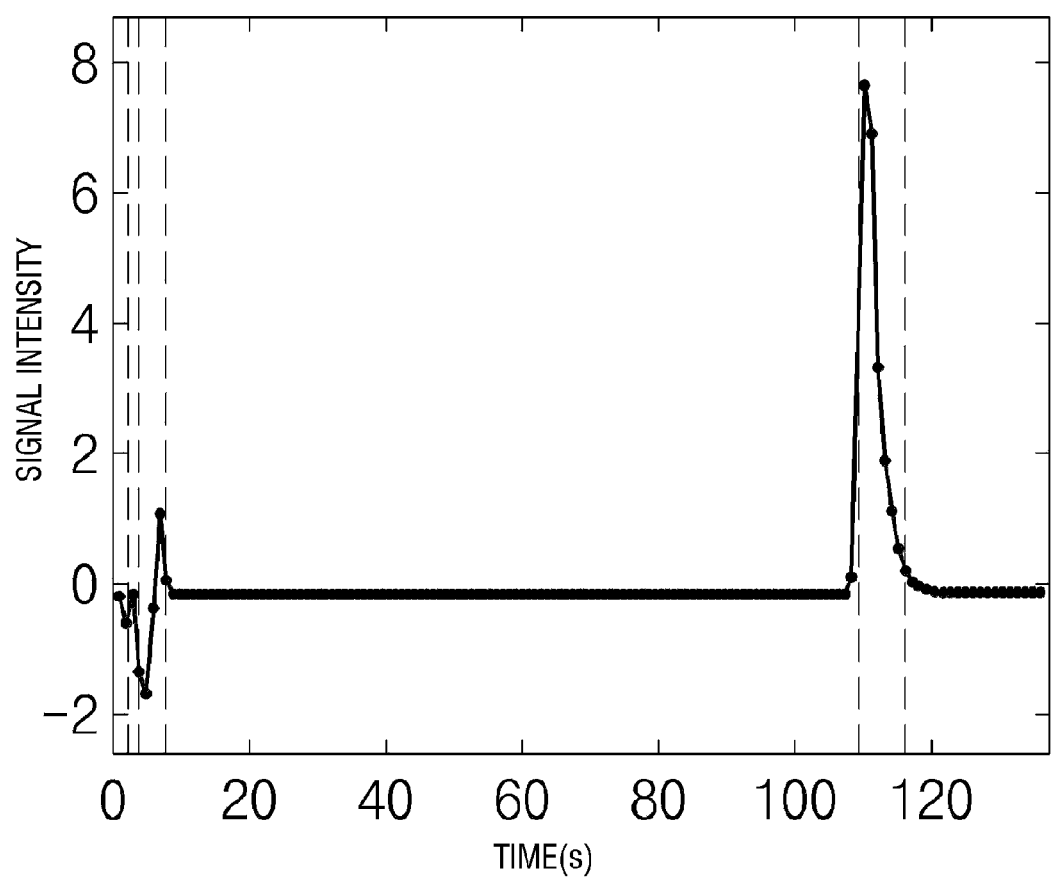
Figure 6D:
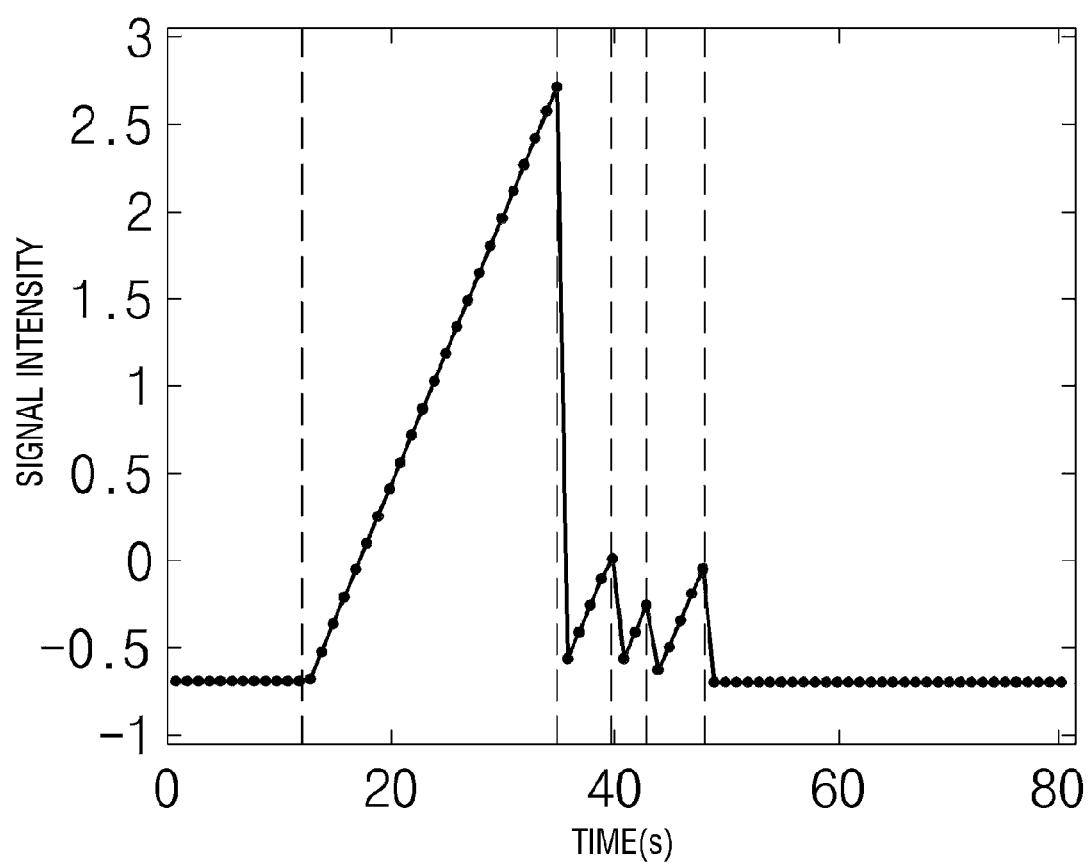

FIG. 5 includes signal waveforms showing a result of performing an abnormal difference (AD) segmentation on sensor data according to an exemplary embodiment of the present inventive concept. FIG. 5(a) corresponds to original data with segments which are distinguished through dotted lines and FIG. 5(b) corresponds to an AD segmentation result where points with high data variation are represented.

As shown in FIG. 5, when segmentation is performed at the point with high data variation (e.g., AD), sensor data in each segment has similar signal characteristics.

FIGS. 6A-D are signal waveforms showing results of finding segments having a non-zero value of signal difference and performing linear segmentation according to an exemplary embodiment of the present inventive concept.

As shown in FIGS. 6A-D, Piecewise Linear Segmentation is performed to find consecutive segments (e.g., continuous-value range), from among segments segmented through the AD segmentation, having a signal differential value of non-zero and to perform linear segmentation. This introduces the concept of classifying differential values that consistently increase/decrease into the same group. However, when a signal has a continuous characteristic and thus has a small differential value, it might not be obvious at which point to perform segmentation. In this case, the sensor data may be determined whether it is discrete-type data or continuous-type data according to continuity.

Figure 7A:
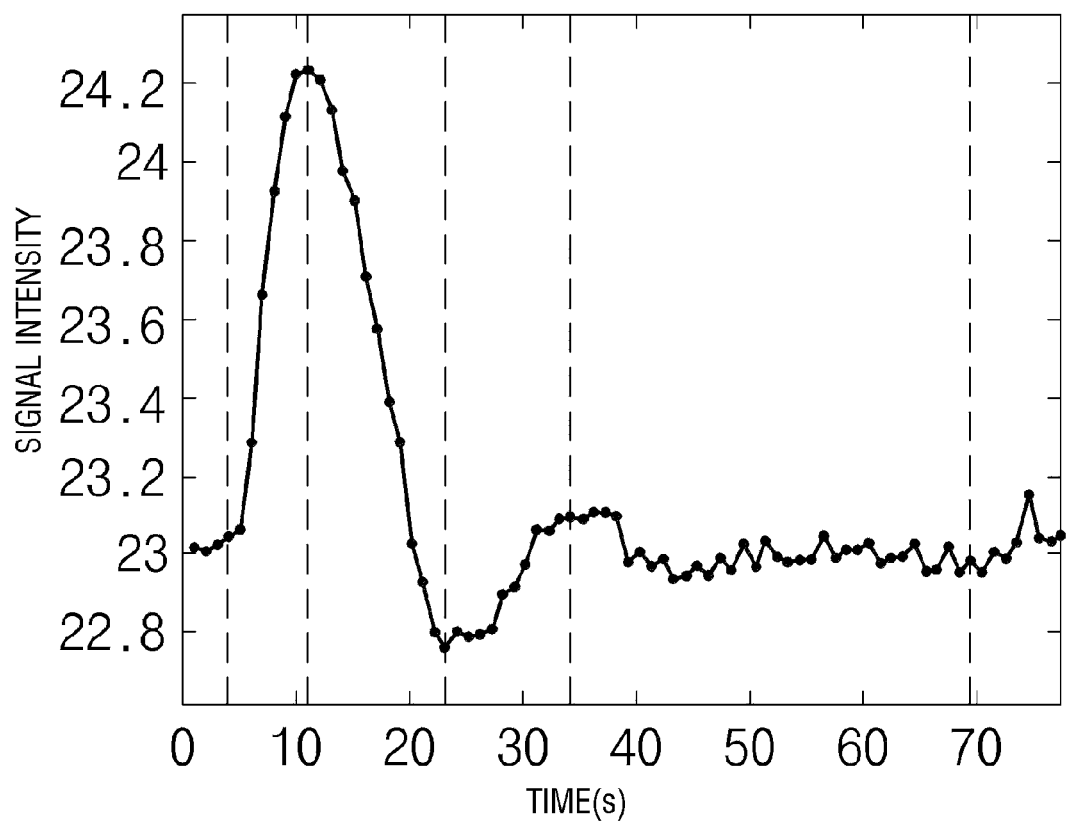
Figure 7C:
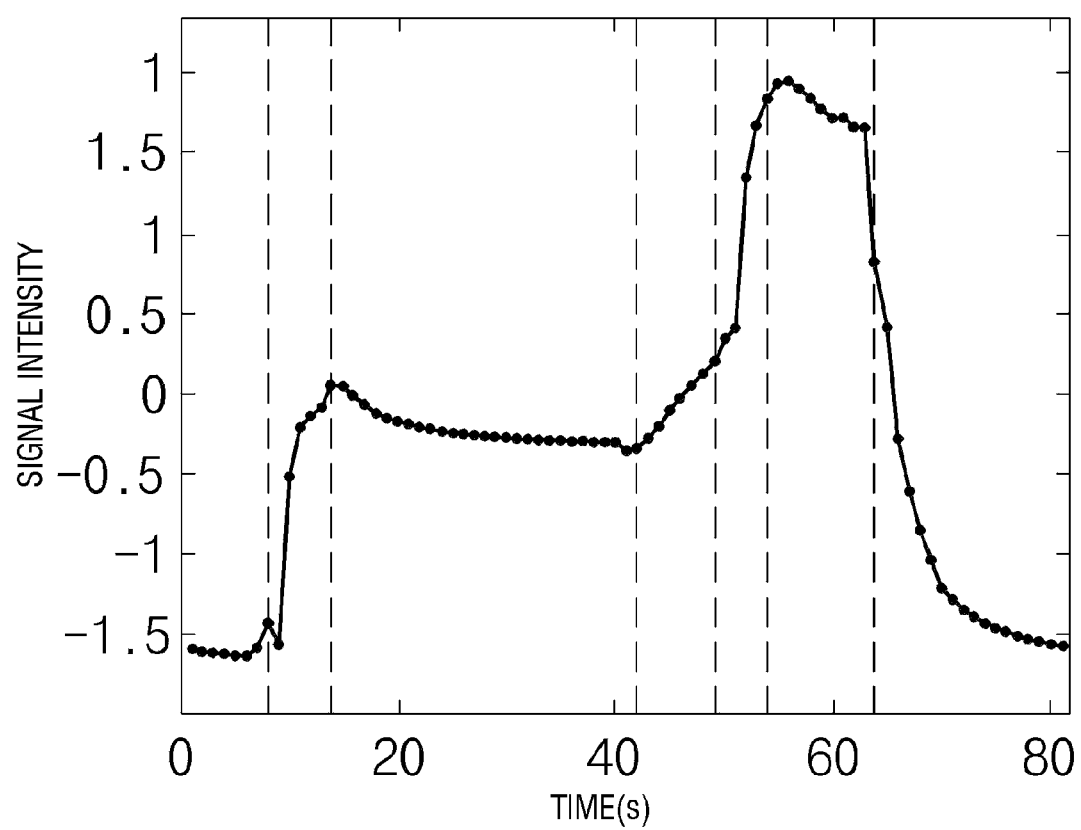

FIGS. 7A-C are signal waveforms showing results of performing an FS segmentation on sensor data according to an exemplary embodiment of the present inventive concept.

As shown in FIGS. 7A-C, an optimal segmentation is performed in consideration of the number of knots and a pattern-explanation capability for a signal having a continuous pattern, using the FS algorithm.

Figure 8A:
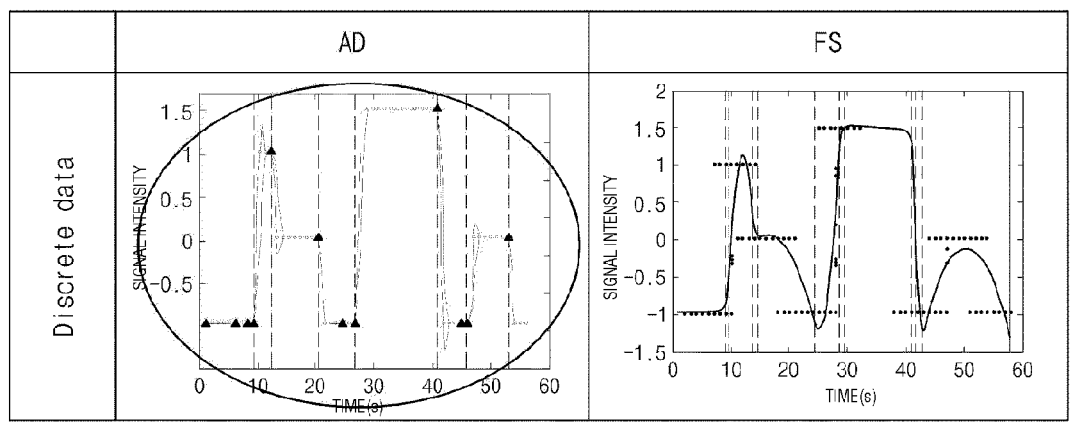
FIGS. 8A-B are signal waveforms showing comparison results between a result of performing the AD segmentation and a result of performing the FS segmentation to select one of the results according to an exemplary embodiment of the present inventive concept.
Figure 8B:
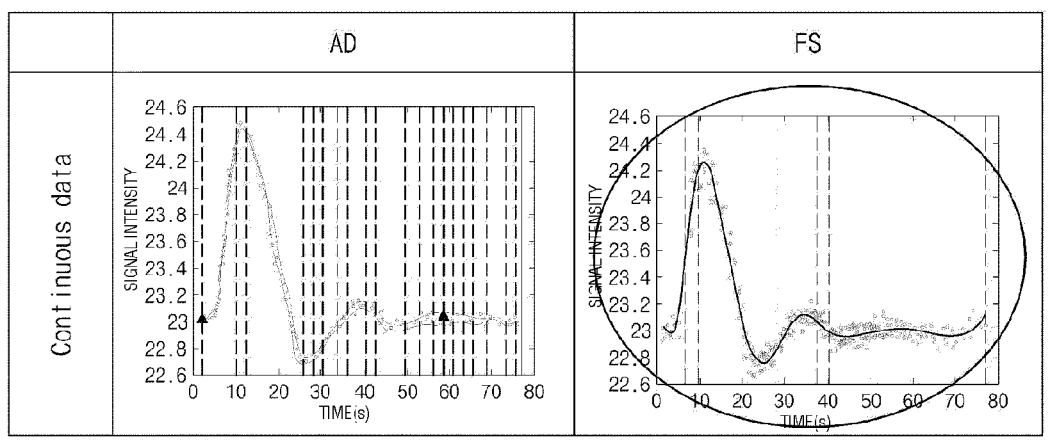

FIGS. 8A-B are signal waveforms showing comparison results between a result of performing the AD segmentation and a result of performing the FS segmentation to select one of the results according to an exemplary embodiment of the present inventive concept, FIG. 8A is a signal waveform showing that a result using the AD segmentation has lower noise and a smaller number of segments, and FIG. 8B is a signal waveform showing that a result using the FS segmentation has lower noise and a smaller number of segments.

As shown in FIGS. 8A-B, the sensor data may be segmented into optimal segments by comparing the AD segmentation result with the FS segmentation result.

The apparatus and method of segmenting sensor data of a semiconductor manufacturing facility according to an exemplary embodiment of the present inventive concept may segment the sensor data of the semiconductor manufacturing facility into meaningful segments to automatically summarize the sensor data in units of one second or less. Thus, the sensor data segmented into optimal segments may be used to detect a problem in the facility during processing of a wafer or to find out a correlation of the facility with a defective wafer. Errors and calculation loads to monitor a process during the semiconductor manufacturing process may be reduced. For example, the present inventive concept segments a facility tracking signal into meaningful segments to automatically generate statistic information, which may be utilized to detect micro variations in the facility or to find out a detailed cause due to the facility during quality analysis.

Although the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

What is claimed is:

1. An apparatus of segmenting sensor data output from a semiconductor manufacturing facility, comprising:
   a sensor operative to collect sensor data corresponding to at least one process of the semiconductor manufacturing facility;
   a first segmentation unit operative to extract at least one variation point of the sensor data to perform an abnormal difference (AD) segmentation on the sensor data based on the at least one variation point, and to generate first segments;
   a continuity evaluation unit operative to evaluate a continuity ratio of the sensor data;
   a second segmentation unit operative to perform a free-knot spline (FS) segmentation on the sensor data when the continuity ratio exceeds a reference ratio and to generate second segments; and
   a segmentation determination unit operative to compare a result of performing the AD segmentation with a result of performing the FS segmentation and to select either the first segments or the second segments based on the comparison result.

2. The apparatus of claim 1, further comprising a pre-processing unit operative to make lengths of the sensor data equal to a first length, wherein the first segmentation unit is operative to determine a first point in the sensor data having the first length as the at least one variation point when an amount of variation at the first point is larger than a predetermined value.

3. The apparatus of claim 2, wherein the pre-processing unit is operative to filter out abnormal data among the sensor data.

4. The apparatus of claim 2, wherein the first segmentation unit is operative to recognize the at least one variation point as a separator to perform the AD segmentation.

5. The apparatus of claim 2, wherein the continuity evaluation unit is operative to find a first time period corresponding to third segments among the first segments, and to evaluate the continuity ratio of the sensor data used on the first time period, and the third segments appear consecutively and each of the third segments has a non-zero value of variation.

6. The apparatus of claim 5, wherein the continuity evaluation unit is operative to determine the sensor data as continuous-type data when the continuity ratio exceeds the reference ratio.

7. The apparatus of claim 5, wherein the second segmentation unit is operative to perform the FS segmentation by repeatedly estimating and removing a position of a knot.

8. The apparatus of claim 1, further comprising a post-processing unit operative to perform a post-processing process, wherein the post-processing process comprises incorporating a one-point segment into a segment nearer the one-point segment among the left and right segments with respect to the one-point segment when the one-point segment is among the first segments and the second segments.

9. The apparatus of claim 1, wherein the reference ratio is about 50%.

10. The apparatus of claim 1, wherein the selecting of either the first segments or the third segments is performed based on a determination of which segments of the first and second segments has less noise and a smaller number of segments.

11. A computer system comprising:
a processor; and
a non-transitory, tangible, program storage medium, readable by the computer system, embodying a program of instructions executable by the processor to perform method steps for segmenting sensor data output from a semiconductor manufacturing facility, the method comprising:
collecting sensor data corresponding to at least one process of the semiconductor manufacturing facility;
extracting at least one variation point of the sensor data;
performing an abnormal difference (AD) segmentation on the sensor data based on at least one variation point to generate first segments;
finding second segments among the first segments, wherein the second segments appear consecutively and each of the second segments has a non-zero of variation;
evaluating a continuity ratio of the sensor data based on a time period corresponding to the second segments;
performing a free-knot spline (FS) segmentation on the sensor data when the continuity ratio exceeds a reference ratio to generate third segments;
comparing a result of performing the AD segmentation with a result of performing the FS segmentation; and
selecting either the first segments or the third segments based on the comparison result.

12. The computer system of claim 11, the method further comprising performing a pre-processing process of making lengths of the sensor data equal to a first length, wherein the extracting of the at least one variation point comprises determining a first point in the sensor data as the at least one variation point when an amount of variation at the first point is larger than a predetermined value.

13. The computer system of claim 12, wherein the performing of the AD segmentation comprises recognizing the at least one variation point as a separator.

14. The computer system of claim 12, wherein the evaluating of a continuity evaluation unit comprises determining the sensor data as continuous-type data when the continuity ratio exceeds the reference ratio.

15. The computer system of claim 14, wherein the performing of the FS segmentation comprises repeatedly estimating and removing a position of a knot.

16. The computer system of claim 11, wherein the reference ratio is about 50%.

17. The computer system of claim 11, wherein the selecting of either the first segments or the third segments is performed based on a determination of which segments of the first and third segments has less noise and a smaller number of segments.

18. A method, implemented by an apparatus, of segmenting sensor data output from a semiconductor manufacturing facility, comprising:
collecting, by a sensor of the apparatus, sensor data corresponding to at least one process of the semiconductor manufacturing facility;
performing, by a pre-processing unit of the apparatus, a pre-processing process to make lengths of the sensor data for a plurality of wafers equal to a first length;
extracting, by a first segmentation unit of the apparatus, at least one variation point of the sensor data;
performing, by the first segmentation unit, a segmentation using a first algorithm on the sensor data based on at least one variation point to generate first segments;
finding, by a continuity evaluation unit of the apparatus, second segments among the first segments;
evaluating, by the continuity evaluation unit, a continuity ratio of the sensor data based on a time period corresponding to the second segments, wherein the second segments appear consecutively and each of the second segments has a non-zero of variation;
performing, by a second segmentation unit of the apparatus, a segmentation using a second algorithm on the sensor data when the continuity ratio exceeds a reference ratio to generate third segments;
comparing, by a segmentation determination unit of the apparatus, a result of performing the segmentation using the first algorithm with a result of performing the segmentation using the second algorithm; and
selecting, by the segmentation determination unit, either the first segments or the third segments based on the comparison result; and
identifying one or more defective wafers fabricated within the semiconductor manufacturing facility using the selected segments.

19. The method of claim 18, wherein the first algorithm is an abnormal difference algorithm and the second algorithm is an free-knot spline algorithm.

20. The method of claim 18, wherein the performing of a pre-processing process comprises deriving a representative length for each chamber, making processing time lengths corresponding to the respective the plurality of wafers equal to each other, and filtering out a sensor corresponding to a first wafer having abnormal deviation and the first wafer.

* * * * *